July 23, 1935. N. A. CHRISTENSEN Re. 19,650

STRAIGHT AND AUTOMATIC AIR BRAKE SYSTEM

Original Filed Oct. 26, 1925 5 Sheets-Sheet 1

INVENTOR.
Nils A. Christensen
BY Fessler & French
ATTORNEYS

July 23, 1935. N. A. CHRISTENSEN Re. 19,650

STRAIGHT AND AUTOMATIC AIR BRAKE SYSTEM

Original Filed Oct. 26, 1925 5 Sheets-Sheet 2

INVENTOR
NIELS A. CRISTENSEN
BY Charles T. French
ATTORNEYS

STRAIGHT AND AUTOMATIC AIR BRAKE SYSTEM

Original Filed Oct. 26, 1925 5 Sheets-Sheet 3

Inventor
NIELS A. CRISTENSEN

By Quarles & French

Attorneys

July 23, 1935. N. A. CHRISTENSEN Re. 19,650

STRAIGHT AND AUTOMATIC AIR BRAKE SYSTEM

Original Filed Oct. 26, 1925 5 Sheets-Sheet 4

Inventor

Niels A. Christensen

By Charles F. French

Attorney

STRAIGHT AND AUTOMATIC AIR BRAKE SYSTEM

Original Filed Oct. 26, 1925 5 Sheets-Sheet 5

INVENTOR
NIELS A. CRISTENSEN

BY Duarles & French
ATTORNEYS

Reissued July 23, 1935

Re. 19,650

UNITED STATES PATENT OFFICE 19,650

STRAIGHT AND AUTOMATIC AIR BRAKE SYSTEM

Niels A. Christensen, Cleveland, Ohio

Original No. 1,614,652, dated January 18, 1927, Serial No. 65,024, October 26, 1925. Application for reissue October 17, 1928, Serial No. 313,157

15 Claims. (Cl. 303—26)

The invention relates to air brake systems for vehicle trains.

The object of the invention is to provide a brake system for operating and controlling air or fluid-pressure-operated brakes on vehicle trains, whereby the advantages of straight air brake application may be obtained, and automatic air brake application may be had in case the vehicles of the train should pull apart or otherwise become separated from the main or driving vehicle.

The invention further consists in the several features hereinafter set forth and more particularly defined by claims at the conclusion hereof.

In the drawings, Fig. 1 is a diagrammatic view of an air brake system embodying the invention;

Figure 1:
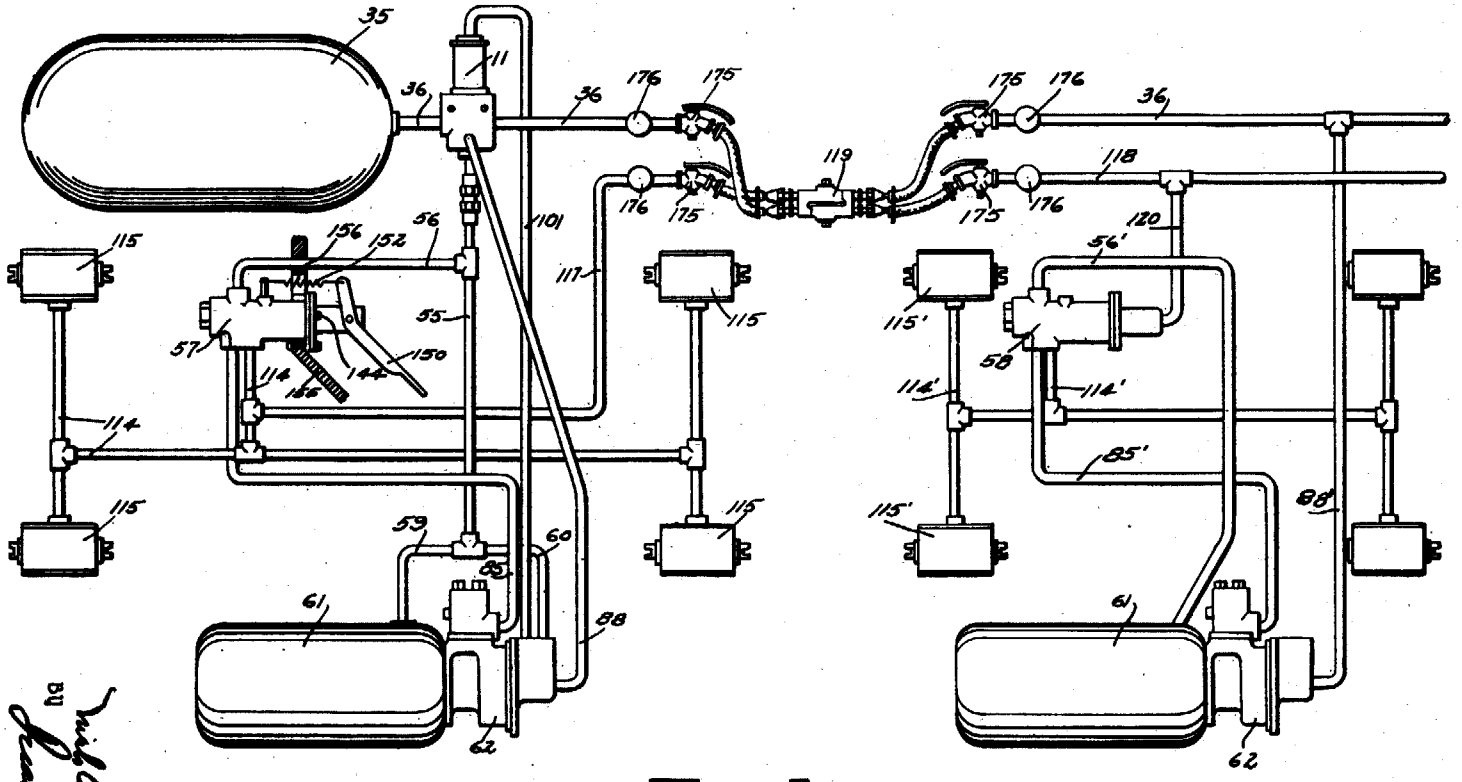
Figure 3:
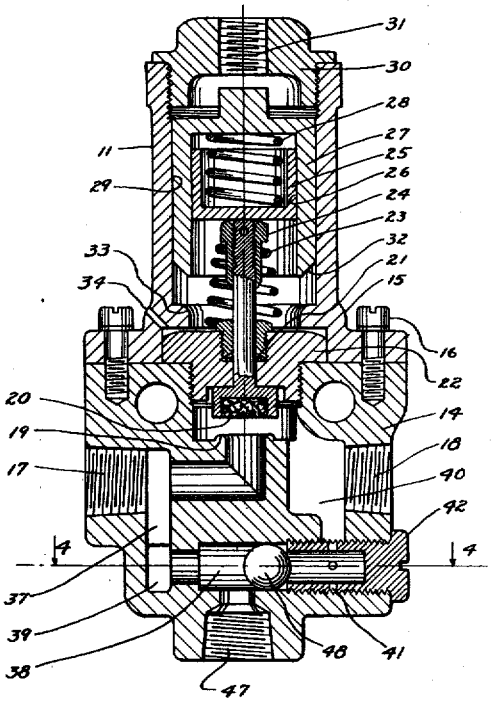
Fig. 3 is a section taken on the line 3—3 of Fig. 2.
Figure 2:
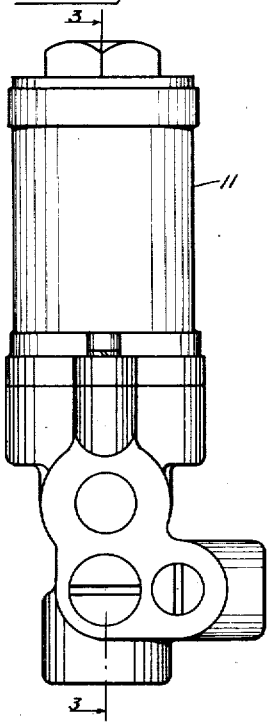
Fig. 2 is a side elevation of one of the valve mechanisms employed in the system.
Figure 4:
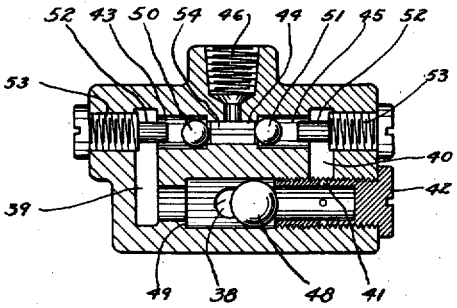
Fig. 4 is a section taken on the line 4—4 of Fig. 3.

In order to cut off the escape of air from the main reservoir pipe line, in case the vehicles of the train pull apart, cut-off valve mechanism 11, shown in Figs. 2 to 4, inclusive, is provided. This valve mechanism includes a two-part casing 14 and 15 secured together by bolts 16, and is inserted in the reservoir pressure pipe 36 on the hauling vehicle and includes an inlet passage 17 and an outlet passage 18, with a valve seat 19 adapted to cooperate with a valve 20 so as to close off communication between the inlet and outlet ends 17 and 18. The valve 20 has its stem slidably mounted in a stuffing-box 21 in a plug 22 secured to the casing 14, and is normally held in an open position by a spring 23 interposed between the plug 22 and a nut 24 on the valve stem.

Under certain conditions hereinafter described, the valve 20 is moved to closed position against the seat 19 by compressed air received from the auxiliary reservoir of the hauling vehicle, and for this purpose the upper end of the stem engages a thimble 25 which works in a bore 26 in a piston 27, and a spring 28 is interposed between the thimble 25 and the piston 27. The spring 28 permits relative movement between the thimble 25 and the piston 27 and transmits forces imparted to the piston to the thimble 25 to cause the valve 20 to be seated. The piston 27 works in a bore 29 in the casing section 15, whose upper end is closed by a cap 30 having a port opening 31.

The lower end of the piston 27 is bevelled to form an annular valve 32 which cooperates with a seat 33 formed at the lower end of the bore 29. A vent passage 34 is provided in the casing 15. When compressed air passes through the port 31 and exerts pressure against the piston 27, this force is transmitted through the spring 28 and thimble 25 against the stem of the valve 20 and the parts move downwardly to close the valve 20. As the piston 27 is not packed, during this movement some of the compressed air may pass between the piston and the casing 15 and is permitted to escape through the vent 34. When, however, the valve 20 is moved to a closed position the piston 27 moves down so that the valve face 32 engages the seat 33 and thus seals the vent passage 34, this movement occurring after the valve 20 has been seated on its seat 19 and the spring 28 permitting of this movement of the piston 27 after the thimble 25 has stopped its movement. The seating of the piston 27 in the manner above described cuts off further leakage of air from the main reservoir through the outlet 18 and thereby conserves the air in the brake system.

The casing 14 has a passage 37 communicating with the inlet opening 17 and with passages 38 and 39, and the outlet end 18 has a passage 40 communicating with the passage 38 through holes 41 in a screw-plug 42. The passages 39 and 40 communicate with a passage formed by bores 43, 44 and 45. The bore 44 communicates with a port 46 and the passage 38 communicates with a port 47.

A ball valve 48 works in the enlarged bore of the passage 38 and is adapted to seat either against the end of the tubular plug 42 or a seat 49, so that under some conditions the air entering from the inlet 17 passes down through the passage 37 to the passage 38 and out through the port 47, the ball 48 then closing off communication with the outlet 18 and the passage 40, and under other conditions the ball 48 is moved over into engagement with the seat 49 and air from the outlet end may then pass down through the passage 40, holes 41, into the tubular portion of the cap 42 and out through the port 47. The passage of air to the port 46 is controlled by ball valves 50 and 51, which may, respectively, seat at the respective ends of the reduced bore 44 and are limited in their outward movement by stops 52 forming the ends of screws 53. A cross-shaped distance piece 54 works in the bore 44 and is of a length so that when one of the balls 50 or 51 is seated the other is held off its seat. When the ball 50 is off its seat, air from the inlet 17 may pass from the passage 37 to the passage 39, bores 43 and 44, to the port 46. When the ball 51 is off its seat air may pass from the space 40 through the bores 45 and 44 to the port 46.

The port 47 is connected by piping to the triple valve mechanism of the hauling vehicle and to the brakes. As shown, this piping for the driving vehicle includes a pipe 55 having a branch pipe 56 connected to the control valve mechanism 57, and branches 59 and 60 connected, respectively, to the auxiliary reservoir 61 and the head end of the triple valve mechanism for the hauling vehicle.

Figure 9:
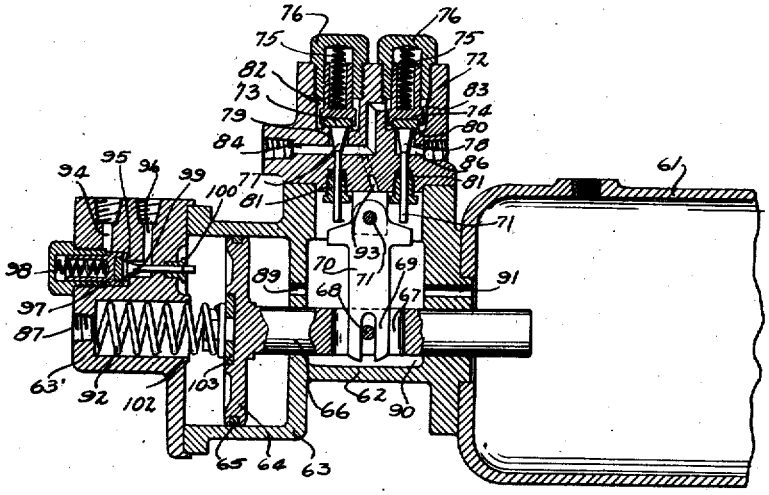
Fig. 9 is a vertical sectional view through the triple valve mechanism for the hauling vehicle, shown in an intermediate position.
Figure 10:
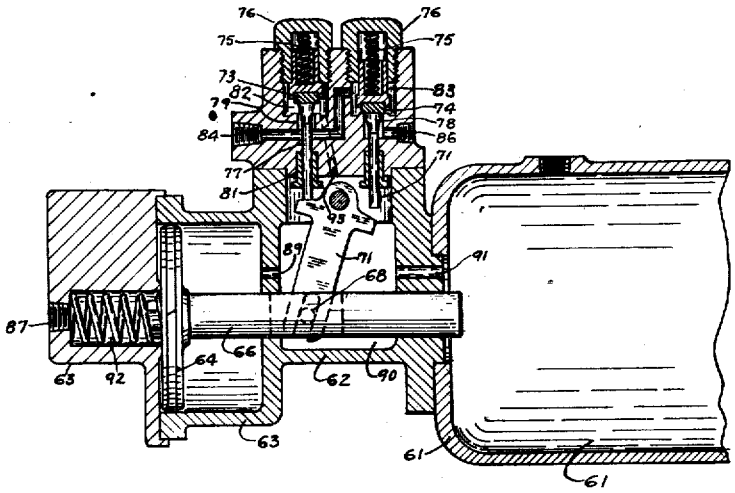
Fig. 10 is a vertical sectional view showing the triple valve for each of the trailer vehicles, showing it in application position.
Figure 11:
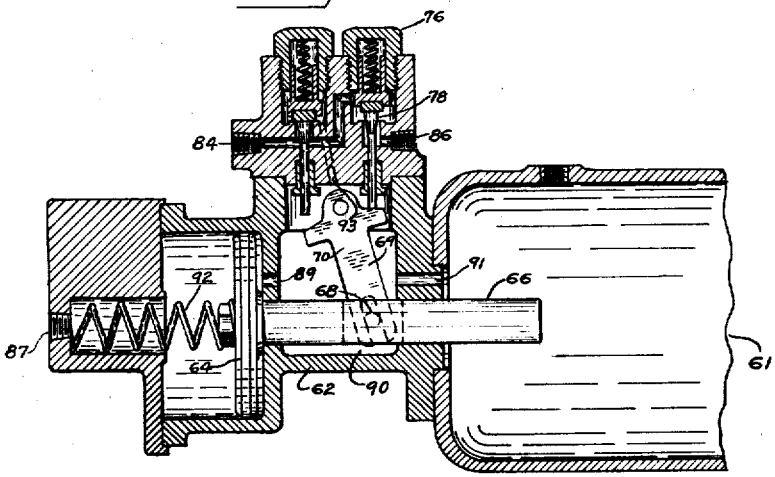
Fig. 11 is a view similar to Fig. 10, showing the triple valve in release position.

Referring to Figs. 9, 10 and 11, the triple valve mechanism, which is mounted on each of the vehicles of the train, includes the auxiliary reservoir 61 and a housing 62 including a cylinder 63 in which the valve-operating piston 64 works. This piston is provided with the usual packing ring 65 and its rod 66 works through the rear end of the cylinder 63 and is slotted at 67 intermediate its ends and provided with a cross-pin 68, and the depending slotted end 69 of a T-headed lever 70 engages this pin within the slotted portion of said rod and is therefore moved by the pin 64. The lever 70 is mounted on a fulcrum pin 71 carried by a depending part of the valve housing 72 containing valves 73 and 74 urged to their seats by springs 75 mounted between the tubular parts of said valves and the box-nuts 76. These valves 73 and 74 are respectively operated by pins 77 and 78 which are tapered toward their stems to allow of the graduated control of the passage of air through the ports 79 and 80. The stems of said pins are preferably packed by suitable stuffing boxes 81. The valves 73 and 74 are held tightly to their seats by their springs unless opened by the lever 70 whose arms, upon the swinging of said lever by the piston 64 and its rod, are adapted to alternately open and close said valves by movement of the operating pins 77 and 78. The housing 72 is securely mounted in an air-tight manner upon the housing 62.

The valves 73 and 74, respectively, work in chambers 82 and 83 which communicate, respectively, when the valves are open, with the ports 79 and 80. The port 79 communicates with a passage 84 connected by a pipe 85 with the exhaust of either of the control valves 57 or 58, said passage 84 also communicating with the chamber 83. The bore 80 communicates with a duct 86 leading to atmosphere.

Main reservoir pressure in pipe 36 is introduced into the forward end of the cylinder 63 through a passage 87 which, in the case of the hauling vehicle, is connected by piping 88 to the port 46 of the valve mechanism previously described in the case of each trailer vehicle by piping 88'. The rear end of the cylinder 63 communicates with the auxiliary reservoir 61 through a port 89, chamber 90 and port 91. There is sufficient leakage between the piston 64 and its cylinder to allow compressed air to equalize itself on both sides of the piston and to allow compressed air to pass around said piston through the passage just mentioned to the auxiliary reservoir 61 to fill it with air to the same pressure as that in the main reservoir.

A spring 92 is interposed between the reduced end of the passage 87 and the head end of the piston and is of a strength to normally move the piston toward the auxiliary reservoir so as to maintain the exhaust valve 74 in open position, as shown in Fig. 11, and keep the inlet valve 13 closed.

A passage 93 connects the space 90 with the chamber 82. For the hauling vehicle the front head 93 for the cylinder 63 has passages 94, 95 and 96, and a valve 97 controls the passage of air from the passages 94 and 95 to the passage 96. This valve is of the same type as the triple valves and is normally held closed by a spring 98 and opened by a pin 99, similar to the operating pin 77, and its stem 100 projects into the cylinder 63 so as to be engaged by the piston 64 as said piston reaches the end of its brake-applying stroke.

The pipe 60 connects with the passage 94 and a pipe 101 connects the passage 96 with the port 31 in the automatic valve mechanism previously described. In addition, the head end 93 of each triple valve cylinder has a rounded seat 102 formed thereon which cooperates with a composition disk 103 on the front end of the piston to seal the bore 87 and the piping connected therewith to prevent the escape of air at auxiliary reservoir pressure when said piston 64 is at the end of its brake-applying stroke, that is, when it is moved against the head 93 and has operated the pin 100.

Figure 7:
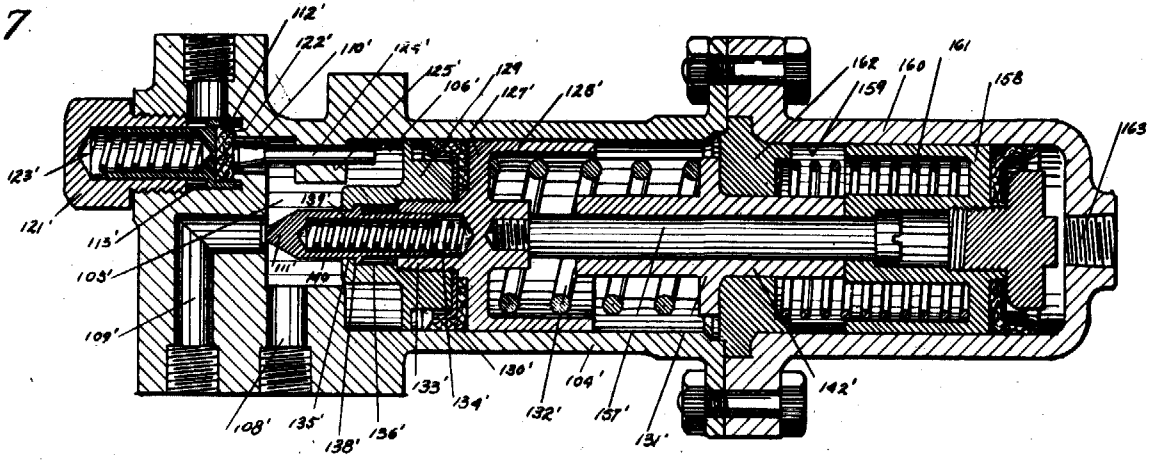
Fig. 7 is a detail sectional view through the control valve on one of the trailers.
Figure 6:
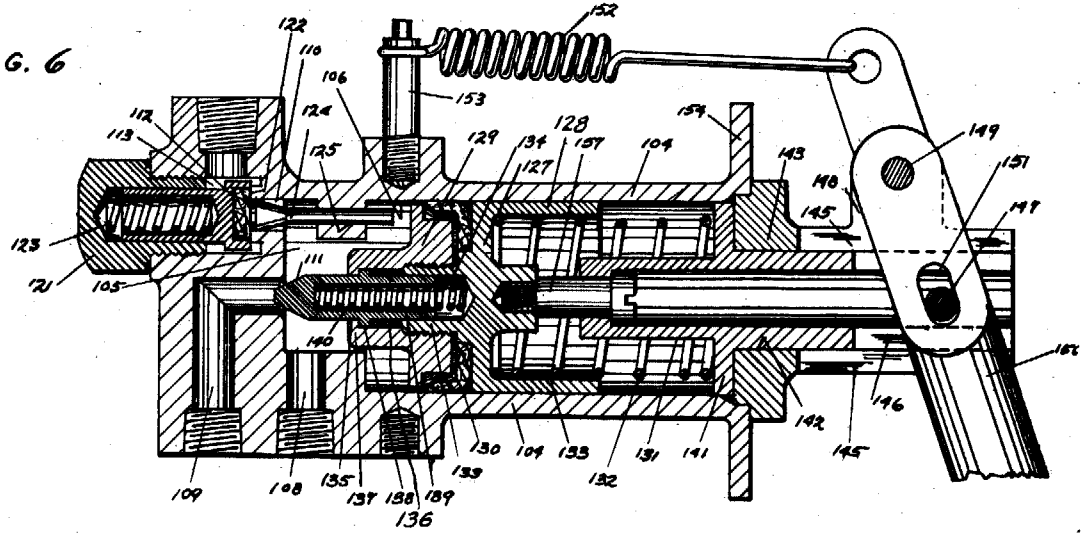
Fig. 6 is a detail sectional view through the operator's control valve.

The control valve mechanisms 57 and 58, shown in Figs. 6 and 7, are similar, except as to their operating means. The control valve mechanism 57 includes a casing 104 having a space 105 therein, including a bore 106. A brake pipe passage 108, a valve-controlled exhaust passage 109, and a valve-controlled inlet passage 110 communicate with the space 105. A relief valve 111 controls the flow of compressed air from the space 105 to the passage 109 and thence through passages hereinafter described to atmosphere, and an inlet valve 112 controls the flow of compressed air from a chamber 113 to the space 105, and the pipe 56 is in communication with the chamber 113. The passage 108 is connected by suitable piping 114 to the brake cylinders 115 associated with the wheels of the driving or hauling vehicle. The piping 114 connected with the control valve 57 is connected by piping 117 on the hauling vehicle to piping 118 on each of the trailer vehicles through couplings 119 hereinafter described. A pipe 120 connects the control valve 58 of each trailer to its pipe 118.

The inlet valve 112 has a tubular portion slidably mounted in the bore of a box-nut 121 and is held against its seat 112 by a spring 123 interposed between the end of said bore and the outer end of the bore in the nut 121. A push-pin 124 is slidably mounted in the passage 110 and has a stem portion mounted in a bore 125 formed in the casing. The head of this pin engages the head of the inlet valve 112 and may be of tapered form for graduating the passage of air through the passage 110. A piston 127, formed of parts 128 and 129 and a flexible packing 130, works in the bore 106 and is moved in one direction by pressure transmitted to it from a plunger 131, by a spring 132, and in the opposite direction by fluid pressure acting against its inner end. The part 128 has a recess in which the spring 132 seats and a threaded tubular end portion 133 with a bore 134. The part 129 has threaded engagement with the portion 133 whereby the medial portion of the packing disk 130 is clamped between said parts, and it has bores 135 and 136 alined with the bore 134, the bore 135 being of smaller diameter than the bore 136 to form a stop flange 137.

The relief or exhaust valve 111 is in the form of a poppet needle type valve having a conical head adapted to seat on the inner end of the passage 109 and having a tubular stem provided with a flange 138 and a bore 139. A spring 140 is mounted in the bore 139 and interposed between the end of said bore and the inner end of the bore 134, and said spring normally acts to move the valve 111 so that its flange 138 abuts against the flange 137. The valve 111 is not responsive to the air pressure in the space 105 to effect its opening but its change in position is due directly to the position and movement of the piston 127.

The plunger 131 has a spring-seating flange 141 and a cylindrical tubular guide portion 142 which is guided in a tubular extension 143 secured to the casing 104 by screws 144 passing through flanges on the casing and said extension, said extension 143 having vertically disposed slots 145 therein. The end of the cylindrical guide portion 142 has a vertically disposed slot 146 formed therein and carries a pin 147. Spaced lugs 148 are also provided on the extension 143, having a fulcrum pin 149 mounted therein.

A foot-pedal or lever 150 is pivoted on the pin 149, works in the slots 145 and 146, and has a slot 151 through which the pin 147 passes. This lever, by means of a spring 152 secured to it and to a stud 153 mounted on the casing, is moved, with the plunger 131 associated with it through the pin-and-slot connection above described, to its outer position in which the spring 132 is relieved or substantially relieved of its tension. When, however, the operator presses down on the lever 150, the plunger 131 is moved inwardly, putting a tension on the spring 132 which thereby transmits its force to the piston 127, causing it to move inwardly.

The casing 104 is provided with a flange 154 for conveniently mounting on the dash 155 of the driving vehicle, and the spring 152 works through a hole 156 in the dash.

The piston 127 may move with the plunger 131 near the end of the outward movement of the plunger 131, because of a connection between these parts consisting of a screw 157.

As shown in Fig. 6 the parts are in non-application position, and it will be noted that the relief or exhaust valve 111 is open and that the stem of the operating pin 124 is spaced from the inner end of the piston at a greater distance than is necessary to cause the travel of said piston to seat the valve 111.

To make a brake application the operator presses down on the lever 150 and moves the plunger 131 inwardly which, through the spring 132, causes an inward movement of the piston 127 and this in turn, through the spring 140, causes the exhaust valve 111 to be moved to its seat to close off the exhaust passage 109. Further inward movement puts pressure upon the valve 111 through compression of the spring 140 and then causes the piston 127 to engage the pin 124 and move it to open the inlet valve 112, whereupon the compressed air coming from the reservoir 35 through the pipe 36, the cut-off valve previously described, and the pipe 56, enters the space 105 and thence passes through the passage 108 to the brake pipe 114 and thence to the brake cylinders 115. As the pressure in the brake system builds up the pressure in the space 105 in front of the piston 127 increases until it overcomes the pressure being exerted by the operator through the spring 132, and when said pressure exceeds the pressure of the spring 132 the piston 127 travels away from the stem of the pin 124 and the inlet valve 112 closes and the parts are then in a "lap" position, since the piston travel then is not sufficient to relieve the pressure on the spring 140 to such an extent as to permit unseating of the valve 111 which, it will be noted, has a greater tendency to remain seated because of the pressure in the chamber 105 than to be opened because of the differential area of the seat and the valve. Thereafter release of the pressure on the spring 132 by release of the pressure on the foot-pedal will cause the piston 127 to travel outward, due to pressure exerted on it by the compressed fluid in the space 105, and when the flange 137 engages the flange 138 it will cause an opening of the relief valve 111 and an exhaust of air from the brake system, since the exhaust passage 109 is connected by a pipe 158 to the port 84 of the triple valve mechanism which communicates with the chamber 83 and the exhaust passage 86, which last-named chamber and passage are in communication with each other by the then opened condition of the exhaust valve 74 of the triple valve mechanism on the driving vehicle, this valve being open at that time because the spring 92 has moved the piston 66 to a release position.

Each of the control valves 58 of the trailer vehicles includes a casing 104', similar to the casing 104, provided with a brake passage 108' and an exhaust passage 109' and an inlet passage 110'. A relief valve 111' controls the passage of air through the passage 109' and an inlet valve 112' controls the passage of air from the chamber 113' through the passage 110'. The passage 108' is connected by suitable piping 114' to the brake cylinders 115' associated with the trailer on which control valve 58 is mounted. A pipe 56' connects the auxiliary reservoir 61 of each trailer with the chamber 113' of its control valve and a pipe 85' connects the passage 109' of each trailer control valve with the passage 84 of its triple valve mechanism, which is similar to that on the driving vehicle and similarly referenced, and the pipes associated with the cut-off valve mechanism for the trailer and the head end of the triple valve mechanism are similarly referenced as 88 and 101.

The parts 121' to 134', inclusive, are similar to parts 121 to 134, inclusive, of the valve 57 and similarly mounted and arranged as in the previously described construction with the exception that the plunger 131' of the valve 58 does not have a slotted end but abuts against a suitably packed piston 158 which works in a bore 159 formed in the extension 160 bolted to the case 104', and a spring 161 is interposed between the piston and a guide 162 for the plunger 131' and acts to move said piston outwardly. Compressed air is introduced from the pipe 128 through a port 163 against the piston 158.

A bolt 157' extends through the plunger 131' and connects the piston 127' with the piston 158 but permits the piston 127' to move relative to the plunger 131' and the piston 158. The piston 158 is substantially of the same diameter as the compensating piston 127' in the valve proper. Thus, when the operator steps on the foot-pedal 150 and admits air into the brake pipes 114, some of this air passes through the piping 117 and 118 to the pipes 120 associated with the control valves 58 on each of the trailer vehicles. This air acting against the piston 158 of each valve 58 moves the plunger 131' and thereafter through the springs 132' moves the piston 127' and effects the closing of the exhaust valves 111' and the opening of the inlet valves 112' in the same manner that the exhaust valve 111 and the inlet valve 112 are operated in the master valve 57, and the compensating action previously described in connection with the main control valve 57 is similarly effected by similar parts in the valves 58 of the trailers. Thus, the operation of the master valve 57 by the operator causes an introduction of compressed air to the pipes 56' and thence to the brake system of each trailer, including piping 114' and the brake cylinders 115'.

The compensating action above referred to is effected in each of the valves 58 since when the pressure builds up in the chamber 105 to close off the inlet valve 112 this same pressure builds up in the chamber 105' to close off the inlet valve 112', and the closing off of the inlet valve 112 stops further building up of pressure in the piping, including the pipe 120 associated with the piston 158. The spring 161 is a comparatively light spring and is used more particularly to overcome the friction of the piston 158 to return it to a released position.

Figure 8:
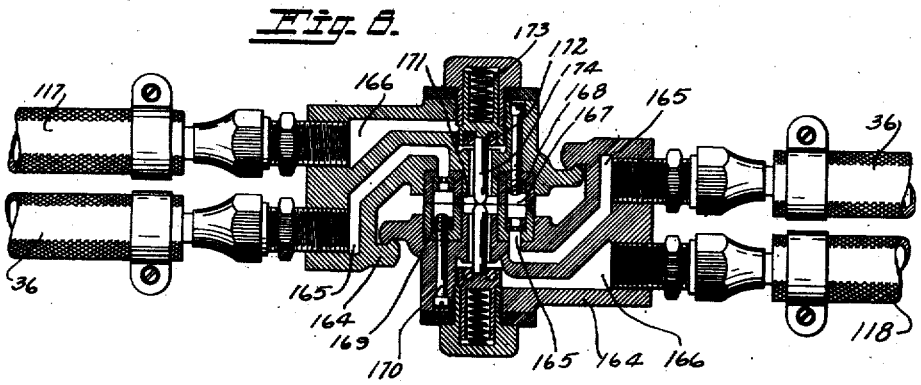
Fig. 8 is a vertical sectional view through the coupling between the vehicles.

The pipes 117 and 118 and the sections of the pipes 118 between each trailer may be connected by a suitable coupling in which provision is made for sealing the end of each of these pipes when the vehicles are uncoupled. The sections of the reservoir pressure pipe 36 may also be provided with a suitable coupling, but I prefer to use a single coupling device for the pipes 36 and the pipes 117 and 118 or pipes 118, and such a device is shown in Fig. 8. As the particular construction of this coupling has been made the subject-matter of a separate application it will be only briefly described here.

This coupling includes a pair of interlockable coupling members 164 having passages 165 and 166 therein. The passages 165 communicate with each other through an annular space 167 formed by cooperating annular flexible packing rings 168, each of which is secured to its respective coupling member by a metal ring 169 and bolts 170. The passages 166 communicate with each other through a central passage 171 formed by the abutting rings 168, and a spring-pressed check valve 172 is mounted in each of the passages 166 and urged by a spring 173 to close off said passage when the coupling members become separated, but when the coupling members are coupled together the pin extensions 174 of these valves are brought into abutting engagement with each other and move the valves off their seats so that a through passage of air is established between the pipe 117 and the pipe 118. The pipe 118, of which a section is provided on each trailer, extends the entire length of the train and with the pipe sections 36 is coupled together between each of the trailer vehicles by a coupling device similar to that just described.

Manually-operable cut-off valves 175 are provided in the reservoir pipe line 36, as well as for the brake pipes 117 and 118, and air strainers 176, of any suitable construction, are also provided in the reservoir and brake pipe lines.

With the above construction, under normal conditions compressed air passes from the main reservoir 35 through the reservoir pipe 36, the valve 20 of the cut-off valve mechanism 12 being then open, and through the port 47 by way of either of the passages 37, 39, 38 or 40, 41, 38 to the pipe 55 and thence through the pipe 59 to the auxiliary reservoir of the hauling vehicle, and at the same time air may pass past either one of the balls 50 or 51 to the port 46 and thence through the pipe 88 to the head end of the triple valve piston of the hauling vehicle. Under these conditions also air from the reservoir pipe 36 passes through the pipe 88' on each trailer to the passage 87 of the triple valve mechanism of each trailer and past its piston and through port 89, chamber 90, port 91, to its auxiliary reservoir 61. Thus, compressed air from the main reservoir is introduced into the auxiliary reservoirs of each vehicle of the train.

Under these conditions pressure on both sides of the triple valve piston 64 of each of the triple valve mechanisms is equalized, and in each instance the spring 92 moves and maintains said piston in a release position, thereby holding the exhaust valve 74 of each triple valve mechanism open and hence the valve 97 associated with the triple valve mechanism of the hauling vehicle remains closed. The apparatus is then in a condition for straight air brake application and remains in this condition unless the couplings 119 pull apart.

When it is desired to apply the brakes to the vehicle train, the operator presses down on the foot-pedal 150 and this closes exhaust valve 111 and opens inlet valve 112 thereby admitting compressed air from the main reservoir through the pipe 56, chamber 113, passages 110, 105, 108 to the piping 114 and thence to the brake cylinders 115, as well as compressed air from the auxiliary reservoir 61 of the driving vehicle by way of pipes 59 and 55 to the pipe 56.

As soon as compressed air is admitted into the brake piping 114 of the main vehicle, some of this air passes through the pipe 117 to the piping 118, from which it is taken off by the pipe 120 on each trailer vehicle to the head end of control valve 58 of that vehicle and acts against the piston 158 of this control valve to close the relief valve 111' and open the inlet valve 112', and thereby admit compressed air coming from the auxiliary reservoir 61 on this vehicle through pipe 56' into the chamber 105' and to passage 108', piping 114' to the brakes 115'. Thus, the introduction of air into the brake system of the hauling vehicle, by the operator's operation of the master control valve 57, operates the control valve 58 of each of the trailers, which causes an admission of compressed air from the auxiliary reservoir of each trailer into the brake system of that trailer.

When the operator releases the brake pedal 150, thereby closing the inlet valve 112, he causes the opening of relief valve 111. As soon as the relief valve 111 opens pressure in the brake system 114, 115 drops, causing a release of the brakes in the hauling vehicle, the air exhausting through the passage 109 by way of pipe 85 and the triple valve of this vehicle through passage 84, chamber 83 and port 86 to atmosphere. The release of air in the piping 114 causes a release of train-pipe pressure in the piping 117 and 118 so that the control valves 58 move to release position, that is, the inlet valve 112' closes and the exhaust valve 111' opens, allowing the air in the brake system 114', 115' of each trailer to exhaust to atmosphere by way of pipes 85' and passage 84, chamber 83 and port 86 of its triple valve mechanism.

Furthermore, it will also be understood that the control valves 57 and 58 allow of a graduated release or brake application due to the compensating pistons 127 and 127'.

Thus, for straight air brake application the triple valve mechanism remains in release position and speedy application of air to the trailer vehicles is assured by the direct passage of air from their auxiliary reservoirs through their control valves to their brake pipes and cylinders, and also a speedy release is obtained through the open exhaust valve of the triple valve mechanism.

In case the vehicles pull apart at the couplings, the valves 172 close off the open ends of the piping 117, 118, or 118 between the vehicles and the escape of air in the main reservoir pipeline causes a release of air from the front ends of each of the triple valve mechanisms of the trailers through the pipes 88' and 36, thereby causing a reduction in pressure in their cylinders 63 ahead of the triple valve pistons 64, and hence unbalancing the air pressure on these pistons, which causes the pressure of air from their auxiliary reservoirs to act on their pistons to move them, as shown in Fig. 10, to brake application position, thereby closing their exhaust valves 74 and opening the inlet valves 73 by the levers 70 and pins 77 and thus admitting compressed air from said reservoirs through passages 91, chamber 90, passages 93 and 84 to the pipe 85, the then open passage 109', chamber 105', brake piping 114' to the brake cylinders 115, so that the brakes are automatically applied to the trailer vehicles through the automatic operation of their triple valves, and when in applied position seating of the seat or valve 103 on the seat 102 cuts off escape of pressure from the auxiliary reservoirs of the trailer vehicles.

A similar action takes place in the triple valve mechanism of the hauling vehicle since the cut-off valve mechanism operates to close the valve 20 and open the pipe 88 to atmosphere, thereby unbalancing the piston 64 of the triple valve of the hauling vehicle and causing it to function in the same manner as the triple valves of the trailer vehicles to open its inlet valve 73 to admit air from its auxiliary reservoir by way of passage 91, chamber 90, passages 93 and 84 to pipe 85, then open passage 109, chamber 106, brake piping 114 to the brake cylinders 115 so that the brakes are automatically applied to the hauling vehicle through the automatic operation of its triple valve, and when in applied position seating of the valve 103 in the seat 102 cuts off escape of pressure from the auxiliary reservoir of the hauling vehicle through the pipe 88.

Under the conditions of an open reservoir pipe the cut-off valve mechanism functions to close off its valve 20 and open pipe 88 to atmosphere, as follows: As soon as the break occurs the rush of air on the release of air from one side of the device causes the ball 48 to move toward the reduced pressure end which, in this instance, where the break occurs beyond the outlet 18, moves the ball 48 against the inner end of the tube 42, thereby preventing the escape of air from the reservoir through the open line 36. Likewise the rush of air upon the release of air from one side of the device causes the balls 50 and 51 to move toward the reduced pressure end which, in this instance, where the break occurs beyond the outlet 18, moves the ball 50 against its seat and it in turn moves the valve 51 off its seat so that the pipe 88 is then open to atmosphere through the port 46, passages 45, 40, 18 to the open pipe 36. As soon as the pipe 88 is open to atmosphere the piston of the triple valve mechanism of the hauling vehicle moves over to brake application position, as previously described, and near the end of its movement it engages and moves the stem 100 to open the valve 97. The opening of valve 97 causes compressed air from the pipe 60 to pass through the passage 94, chamber 95, passage 96, pipe 101 to port 31 and the chamber above the piston 27, thereby moving the piston 27 and its associated parts to close the valve 20, as previously described, thereby preventing the escape of air from the reservoir through the open reservoir pipe extending from the cut-off valve mechanism 11 on the main or hauling vehicle.

It has been noted that the valves 48, 50 and 51 would function whether a reduction occurred at either the arbitrarily designated inlet end 17 or the outlet end 18 of the cut-off valve mechanism, and this permits this mechanism to be associated with the main reservoir pressure pipe and the triple valve mechanism of each of the trailer vehicles in the same manner that this cut-off valve mechanism is associated with said reservoir pipe and the triple valve mechanism of the hauling vehicle, and it may be so used but in practice I have found that this mechanism is not necessary for the satisfactory operation of the triple valve mechanisms of the trailer vehicles.

Figure 5:
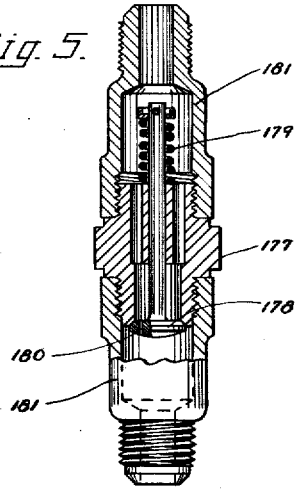
Fig. 5 is a detail sectional view through a check valve in one of the pressure lines.

In order to prevent the possibility of excessive escape of air from the auxiliary reservoir, more particularly of the hauling vehicle, when the triple valve is being put into operation, a check valve construction, shown in Fig. 5, may be associated with the pipes 55 and 55'. This includes a valve casing 177 having a check valve 178 at one end, normally urged to its seat by a spring 179, said check valve having a small bleed hole 180 in its head. The casing 177 is secured by suitable couplings 181 in the pipe line 55. This check valve permits the air at reservoir pressure to pass through pipe 55 to the auxiliary reservoirs 61 but restricts the passage of air in the reverse direction.

From the foregoing description it will be noted that this system provides for the application of the brakes on all the vehicles of the train by straight air with the same facility for efficient control and application of the brakes on the trailer vehicles as is obtained on the hauling vehicle, and that in case the vehicles pull apart the triple valve mechanisms are brought into operation to automatically apply the brakes on the separated vehicles.

It will be understood that the rear end of the reservoir pipe 36 and that of the train pipe 118 are closed off by the valve 175 at the end of the train, and that the main reservoir 35 is charged with compressed air by any suitable compressor, which is generally associated with the propelling motor of the hauling tractor vehicle.

Reference is here made to my copending application Serial No. 23,847, filed April 17, 1925, for Brake control valve, wherein the control valve mechanisms shown in this system are more specifically described and claimed, and since the present application is directed to an air brake system absence of claims to the particular feature of construction of the control valve mechanisms herein is not to be considered as a waiver of claim to invention therefor, as such features have been claimed in the aforementioned application.

I desire it to be understood that this invention is not to be limited to any particular arrangement or construction of parts except insofar as such limitations are included in the claims or necessitated by the prior art.

What I claim as my invention is:

1. In a system for vehicle trains, the combination with the main air reservoir, the reservoir pressure pipe, the brakes of each vehicle, and triple valve mechanism for each vehicle, of means under the control of the operator of the tractor vehicle for effecting an application of the brakes of each vehicle by straight air pressure from the auxiliary reservoirs with the triple valves in a release position and for effecting the release of the brakes through the exhaust passage of the triple valve mechanism, and means for effecting the automatic operation of the triple valve mechanism for each vehicle when the reservoir pressure pipe is opened upon a separation of the vehicles.

2. In a vehicle train air brake system, the combination with the main compressed air reservoir and the reservoir pressure pipe connected therewith, of triple valve mechanism for each vehicle including an auxiliary reservoir supplied with compressed air from the main reservoir, brake pipes associated with the brakes of each vehicle, control valve mechanism associated with the brake pipes and auxiliary reservoir of each vehicle, means under the control of the operator for operating the control valve mechanism of the tractor vehicle, means for operating the control valve mechanism of each trailer vehicle comprising pressure piping connected with the brake pipes of the driving vehicle and receiving compressed air therefrom, and means for effecting the automatic operation of the triple valve mechanism of each vehicle to supply its brake pipes with compressed air when the reservoir pressure pipe is opened upon the separation of the vehicles.

3. In a vehicle train air brake system, the combination with the brake pipe of each vehicle, the main compressed air reservoir and the reservoir pressure pipe connected therewith, of triple valve mechanism for each vehicle, means for normally maintaining each triple valve mechanism in release position, means, under the control of the operator, for admitting compressed air from the auxiliary reservoir of each vehicle to the brake pipe for that vehicle to make a brake application and for effecting the release of the braking pressure through the exhaust passage of the triple valve mechanism, the triple valve mechanism of the trailer vehicles operating automatically to supply compressed air from their respective reservoirs to their respective brake pipes when the reservoir pressure pipe is opened by a separation of the vehicles, and automatic valve mechanism associated with the triple valve mechanism of the tractor vehicle for preventing the escape of compressed air from the main reservoir upon a separation of the parts of the reservoir pipe and permitting the triple valve on said tractor vehicle to function.

4. In a vehicle train air brake system, the combination with the main reservoir, the reservoir pressure pipe, the brake pipes and the triple valve mechanism of each vehicle, of control valve mechanism associated with the brake pipes and auxiliary reservoir of each vehicle, means under the control of the operator for operating the control valve mechanism of the tractor vehicle, means for operating the control valve mechanism of the trailer vehicles by compressed air from the brake pipes of the tractor vehicle, and means for effecting the automatic operation of the triple valve mechanism of each vehicle to supply its brake pipes with compressed air when the reservoir pipe is opened upon the separation of the vehicles.

5. In an air brake system, triple valve mechanism having an auxiliary reservoir, a cylinder, an operating piston and inlet and exhaust valves operatively associated with said piston in combination with a passage at the front end of said cylinder and valve means on said piston adapted to close said passage when said piston has moved to brake-applying position to prevent escape of compressed air from the auxiliary reservoir.

6. In an air brake system, triple valve mechanism comprising an auxiliary reservoir, a cylinder, an operating piston and inlet and exhaust valves operatively associated with said piston, means for balancing the air pressure on both sides of said piston, spring means for moving said piston to "release" position, and means for unbalancing the air pressures on said piston to cause said piston to move to brake-application position, and including a port at the head end of said cylinder, and means on the piston to close said port when the piston has moved to brake-applying position to prevent escape of compressed air from the auxiliary reservoir.

7. In an air brake system, the combination of the reservoir pressure pipe and cut-off valve mechanism including an air-operated cut-off valve in said pipe, of tripe valve mechanism including an auxiliary reservoir, a cylinder, an operating piston, and a control valve associated with said auxiliary reservoir and opened by its movement to brake-applying position to supply compressed air to move said cut-off valve to closed position.

8. In an air brake system, triple valve mechanism in combination with cut-off valve mechanism for the reservoir pressure pipe, the triple valve mechanism including an auxiliary reservoir, a cylinder, a valve-actuating piston in said cylinder, said cylinder having a passage at its front end, and a cut-off-operating valve opened by said piston upon its movement to brake-applying position, said cut-off valve mechanism including a cut-off-valve-controlled reservoir pressure conduit, and a pair of valve-controlled ports communicating with both ends of said conduit, one of said ports communicating with said passage in the front end of said cylinder, the other of said ports communicating with the auxiliary reservoir, and means operated by compressed air from the auxiliary reservoir when said cut-off-operating valve is open to close said cut-off valve.

9. In an air brake system, the combination with the reservoir pressure pipe of cut-off valve mechanism including a casing having a conduit, a valve controlling the passage of air through said conduit, said casing having passages and ports connected with said conduit on opposite sides of said valve, a valve adapted to close off one set of passages leading to one of said ports upon a decrease in pressure at the passage being closed off, and a pair of valves associated with the other port and said passages movable to close one of said passages and to establish communication between said other port and the reduced pressure end of said conduit.

10. In air brake system for vehicle trains, the combination with the main reservoir, the reservoir pressure pipes, the brake-applying devices of each vehicle and triple valve mechanism of each vehicle, of means under the control of the operator of the tractor vehicle for operating said brake-applying devices without operating the triple valves of the triple valve mechanisms, and means for effecting the automatic operation of the triple valve mechanism of each vehicle when the reservoir pipe is opened upon the separation of any of the couplings for said pipe between the vehicles.

11. In an air brake system for vehicle trains, the combination with the main reservoir, the reservoir pressure pipe, and the brake pipes and brake-applying devices of each vehicle, of a single control valve mechanism for direct control of the operation of the brake-applying devices of each vehicle, means, under the control of the operator, for operating the control valve mechanism of the tractor vehicle, and means controlled by compressed air introduced into the brake pipes of the tractor vehicle by the operation of its control valve mechanism for operating the control valve mechanism of each trailer vehicle.

12. In an air brake system for vehicle trains, the combination with the main reservoir, the reservoir pressure pipe, the brake-applying devices of each vehicle and the triple valve mechanism of each vehicle, of control valve mechanism associated with the brake-applying device and auxiliary reservoir of each vehicle, means, under the control of the operator, for operating the control valve mechanism of the tractor vehicle, means controlled by the operation of the control valve mechanism of said tractor vehicle for operating the control valve mechanism of each trailer vehicle, and means for effecting the operation of the triple valve mechanism of each vehicle to automatically operate said brake-applying devices when parts of the reservoir pipe become separated upon the separation of the vehicles.

13. In a vehicle train air brake system, the combination with the main reservoir, the reservoir pressure pipe, the brakes of each vehicle and triple valve mechanism for each trailer vehicle, of means under the control of the operator of the tractor vehicle for effecting an application of the brakes of each vehicle by straight air pressure with the triple valves of the trailer vehicles in a release position and for effecting the release of the brakes of the trailer vehicles through the exhaust passage of their triple valve mechanisms, and means for effecting the automatic operation of the triple valve mechanism for each trailer vehicle when the reservoir pressure pipe is opened upon a separation of the vehicles.

14. In a vehicle train air brake system, the combination with the main compressed air reservoir, the reservoir pressure pipe connected therewith and the brake for each vehicle, of triple valve mechanism for each trailer vehicle and tractor vehicle, brake pipes associated with the brake of each trailer vehicle, vehicle control valve mechanism associated with the brake pipes of the tractor vehicle, vehicle control valve mechanism associated with the auxiliary reservoir of each of the trailer vehicles and rendered operative by compressed air controlled directly by the operation of the control valve mechanism of the tractor vehicle, means under the control of the operator for operating the control valve mechanism of the tractor vehicle, and means for effecting the automatic operation of the triple valve mechanism of each trailer vehicle and the tractor vehicle to supply its brake pipes with compressed air when the reservoir pressure pipe is opened upon the separation of the vehicles.

15. In a fluid pressure brake system for vehicle trains, the combination of a brake applying device for each vehicle, a control valve mechanism for controlling the operation of the brake applying device of each vehicle, means under the control of the operator for operating the control valve mechanism of the tractor vehicle, means rendered operative by the operation of the control valve mechanism of said tractor vehicle for operating the control valve mechanism of each trailer vehicle, and means (not included in the control valve operating means) for communication of actuating fluid with the brake applying devices of each vehicle.

NIELS A. CHRISTENSEN.